April 25, 1961 J. F. DAVIS 2,981,487
GRINDING APPARATUS
Original Filed Dec. 13, 1954
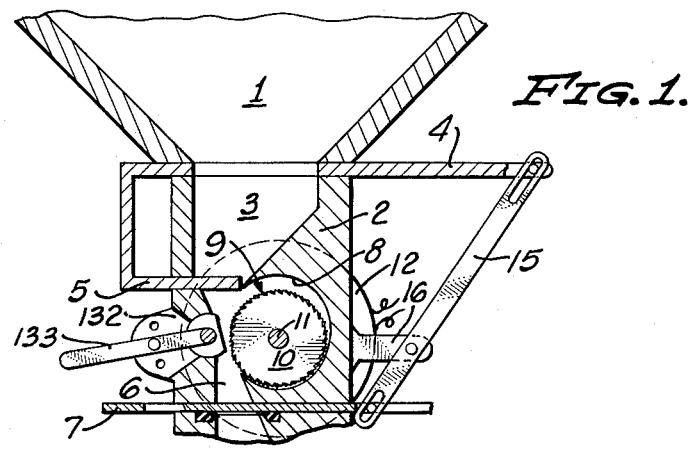
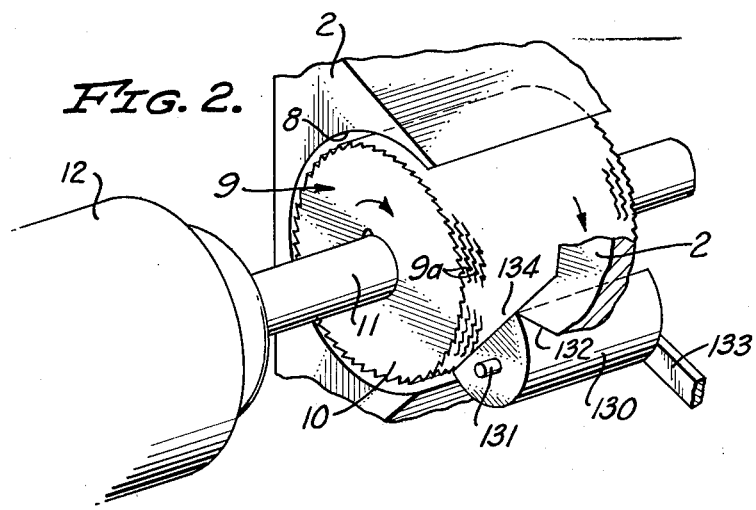
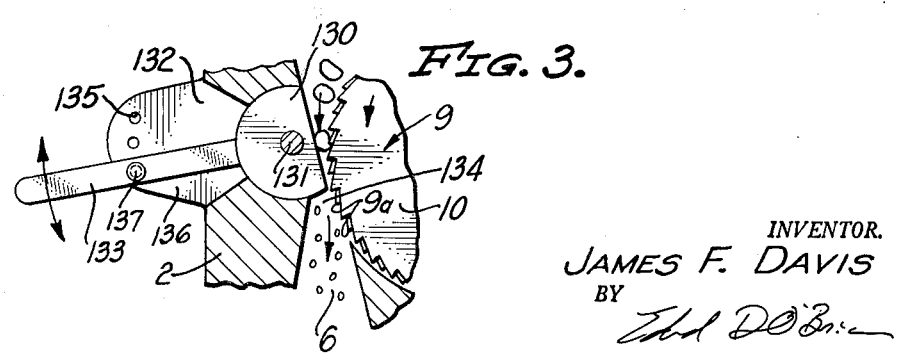
INVENTOR.
JAMES F. DAVIS
BY
ATTORNEY

United States Patent Office

2,981,487
Patented Apr. 25, 1961

2,981,487

GRINDING APPARATUS

James F. Davis, 17154 Nordhoff St., Northridge, Calif.

Original application Dec. 13, 1954, Ser. No. 474,689, now Patent No. 2,868,109, dated Jan. 13, 1959. Divided and this application Jan. 12, 1959, Ser. No. 796,998

1 Claim. (Cl. 241—222)

This invention relates to grinding apparatus of a type intended to be used with coffee-making machines. This application is a division of U.S. Patent #2,868,109 issued January 13, 1959 on application Serial No. 474,689.

More specifically this invention pertains to a type of grinding apparatus which may be referred to as a grinding mill or as a grinder which utilizes a series of co-axially mounted saws which rotate with respect to a semi-cylindrical block or bar designed to control the fineness of a grinding operation achieved through the operation of these saws.

Various objects of the invention, together with the many advantageous features thereof, will be apparent from the following detailed description and by referring to the accompanying drawing in which a preferred form of the invention is illustrated.

In the drawing:

Fig. 1 is a side elevational view, partially in section, of a coffee making machine embodying a grinding apparatus of this invention;

Fig. 2 is a fragmentary perspective view of the coffee grinding apparatus of this machine;

Fig. 3 is a partially cross-sectional view showing how this apparatus may be adjusted.

The device of the invention is, for the sake of simplicity and clearness, diagrammatically outlined in the drawings. The device, in the form illustrated in Fig. 1, includes a hopper 1 of a size to hold stored therein a considerable supply of roasted coffee beans. This hopper is shown mounted on a framing 2 which is recessed from the top thereof to provide a measuring chamber 3 and the passage from the hopper to this chamber is controlled by a sliding valve 4. Beans are free to drop into this chamber while the valve remains open and the beans are held therein by an extension 5 of the valve. A passage 6 leads downwardly through the frame; the bottom of this passage 6 is normally closed by a valve 7. The passage 6 is shown laterally extended to form a cylindrical chamber 8, in which a coffee bean cutting element 9 is rotatably seated. This element consists of a series of circular saws 10 which are mounted on a shaft 11 and a motor 12 is connected to rotate the shaft, see also Fig. 2.

The two valves are operatively interconnected by means of a lever 15 which is pivotally mounted on a bracket 16 of the framing and this lever is operated to close the hopper valve 4 and to open the passage valve 7. The movement of the valve 4 causes the extension 5 thereof to recede and in receding to permit the coffee beans to drop into the passage. When the motor has been started at the time the passage is opened, it is found that the beans will be quickly ground to the required fineness and that the ground coffee will discharge through the passage. The motor is then de-energized and the valves returned to their normal positions. Means for this cycle valve and motor operation are disclosed in the parent application #474,689, now Patent #2,868,109; such means are not herein disclosed.

It was above stated that the coffee grinder consists of a series of circular saws 10 which are mounted on the motor shaft 11. The teeth of these saws will, when relatively staggered as indicated at 9ª in Fig. 2, swiftly and uniformly cut the beans. Means are provided for adjusting the device to determine the fineness of the coffee grind. Such adjustment may be accomplished in accordance with this invention by mounting a substantially semi-cylindrical block or bar 130 for oscillation or operating movement on a shaft or pivot 131 seated in a cylindrical recess 132 of the framing 2, see also Fig. 3. A control handle 133 extends from the bar for manual operation to turn the bar on its pivot thereby to vary the width of the passage 134 between the bar and the teeth of the saws. A concentric row of sockets 135 are sunk into the surface of a lug 136 projecting from the framing and a plunger 137 is mounted in the handle for insertion into the socket corresponding to the desired fineness of the grind.

What is claimed is:

A grinding apparatus which includes: a hopper having a passage leading from the bottom thereof; valve means for closing off said passage; a series of circular saws of uniform diameter co-axially mounted so that the teeth of adjacent saws are staggered so as to extend into said passage on the side of said valve means remote from said hopper; means defining a cavity having cylindrical walls formed in the hopper hollow located at one side of said passage opposite said circular saws; a semi-cylindrical bar having a flattened portion at one side thereof facing said passage, which flattened portion is substantially colinear with one adjacent wall of said passage in one position of said bar mounted concentrically within said cavity parallel to the axis of said saws, said bar fitting closely against the cylindrical walls of said cavity, said cylindrical bar being mounted so as to be capable of being moved in an oscillating manner so as to project varying portions of said flattened portions into said passage; control means for moving said cylindrical bar so as to vary the distance between said bar and said circular saws; and means for rotating said circular saws.

References Cited in the file of this patent

UNITED STATES PATENTS

| Re. 7,143 | Coogan | Aug. 15, 1876 |
|---|---|---|
| Re. 7,264 | Thompson | May 30, 1876 |
| 214,195 | Rhodes | Apr. 8, 1879 |
| 218,953 | Forbes | Aug. 26, 1879 |
| 490,163 | Quiggle | Jan. 17, 1893 |
| 606,174 | Wheat | June 21, 1898 |
| 821,448 | Allbrecht | May 22, 1906 |
| 2,208,040 | Moeller | July 16, 1940 |
| 2,264,049 | Miller | Nov. 25, 1941 |
| 2,297,604 | Bateman | Sept. 29, 1942 |

FOREIGN PATENTS

| 58,729 | France | Nov. 4, 1953 |

(Addition to No. 969,861)